(12) United States Patent
Daherkar et al.

(10) Patent No.: US 9,274,857 B2
(45) Date of Patent: Mar. 1, 2016

(54) METHOD AND SYSTEM FOR DETECTING WORK COMPLETION IN LOOSELY COUPLED COMPONENTS

(75) Inventors: Atul Ravindra Daherkar, Burlingame, CA (US); Manoj Khangaonkar, Foster City, CA (US); Hong Sun, Cupertino, CA (US); Kai Mike Zhang, West Linn, OR (US); Chendong Zou, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 1142 days.

(21) Appl. No.: 11/549,609

(22) Filed: Oct. 13, 2006

(65) Prior Publication Data

US 2008/0148299 A1    Jun. 19, 2008

(51) Int. Cl.
*G06F 3/00* (2006.01)
*G06F 9/54* (2006.01)

(52) U.S. Cl.
CPC ............... *G06F 9/542* (2013.01); *G06F 9/547* (2013.01); *G06F 2209/544* (2013.01)

(58) Field of Classification Search
None
See application file for complete search history.

(56) References Cited

U.S. PATENT DOCUMENTS

| | | | |
|---|---|---|---|
| 5,305,454 A * | 4/1994 | Record et al. | 719/318 |
| 5,465,328 A | 11/1995 | Dievendorff et al. | |
| 5,544,318 A | 8/1996 | Schmitz et al. | |
| 5,682,537 A | 10/1997 | Davies et al. | |
| 5,913,213 A | 6/1999 | Wikstrom et al. | |
| 6,012,094 A | 1/2000 | Leymann et al. | |
| 6,108,654 A | 8/2000 | Chan et al. | |
| 6,112,225 A | 8/2000 | Kraft et al. | 709/202 |
| 6,125,363 A | 9/2000 | Buzzeo et al. | |
| 6,128,611 A | 10/2000 | Doan et al. | |
| 6,178,440 B1 * | 1/2001 | Foster et al. | 709/201 |
| 6,233,585 B1 | 5/2001 | Gupta et al. | |
| 6,438,745 B1 * | 8/2002 | Kanamaru et al. | 717/137 |
| 6,442,572 B2 | 8/2002 | Leymann et al. | |
| 6,449,614 B1 | 9/2002 | Marcotte | |
| 6,601,233 B1 | 7/2003 | Underwood | |
| 6,625,602 B1 | 9/2003 | Meredith et al. | |
| 6,654,948 B1 | 11/2003 | Konuru et al. | 717/127 |

(Continued)

FOREIGN PATENT DOCUMENTS

EP    1603307 A2    12/2005

OTHER PUBLICATIONS

Websphere 6.0.2 by IBM, Oct. 7, 2005, 9 pages.*

(Continued)

*Primary Examiner* — H S Sough
*Assistant Examiner* — Carina Yun
(74) *Attorney, Agent, or Firm* — Janaki K. Davda; Konrad, Raynes, Davda & Victor LLP

(57) ABSTRACT

A computer program product is disclosed. The computer program product includes a computer useable medium that has a computer readable program. The computer readable program when executive on a computer causes the computer to receive a request from a component to invoke a function. Further, the computer readable program, when executed on a computer, causes the computer to asynchronously perform the function according to the request. In addition, the computer readable program, when executed on a computer, causes the computer to provide, to one or more programs, an indication that the function has completed work according to the request.

28 Claims, 11 Drawing Sheets

(56) References Cited

U.S. PATENT DOCUMENTS

| | | | |
|---|---|---|---|
| 6,681,230 | B1 | 1/2004 | Blott et al. ............... 707/104.1 |
| 6,697,802 | B2 | 2/2004 | Ma et al. ............... 707/6 |
| 6,742,016 | B1 | 5/2004 | Bhoj et al. |
| 6,880,086 | B2 | 4/2005 | Kidder et al. ............... 713/191 |
| 6,976,263 | B2 | 12/2005 | Delaney ............... 719/330 |
| 6,993,246 | B1 | 1/2006 | Pan et al. ............... 386/52 |
| 7,020,696 | B1 | 3/2006 | Perry et al. ............... 709/223 |
| 7,047,258 | B2 | 5/2006 | Balogh et al. ............... 707/201 |
| 7,206,848 | B1 | 4/2007 | Zara et al. |
| 7,222,119 | B1 | 5/2007 | Ghemawat et al. |
| 7,921,075 | B2 | 4/2011 | Herness et al. |
| 2002/0007363 | A1 | 1/2002 | Vaitzblit |
| 2002/0016729 | A1 | 2/2002 | Breitenbach et al. ............ 705/9 |
| 2002/0038332 | A1* | 3/2002 | Alverson et al. ............ 709/107 |
| 2003/0004970 | A1 | 1/2003 | Watts |
| 2003/0061256 | A1 | 3/2003 | Mathews et al. |
| 2003/0083912 | A1 | 5/2003 | Covington, III et al. ........ 705/7 |
| 2004/0068501 | A1 | 4/2004 | McGoveran |
| 2004/0093510 | A1 | 5/2004 | Nurmela ............... 726/23 |
| 2004/0162741 | A1 | 8/2004 | Flaxer et al. ............... 705/7 |
| 2004/0178454 | A1 | 9/2004 | Kuroda et al. ............... 257/360 |
| 2004/0193510 | A1 | 9/2004 | Catahan, Jr. et al. ........... 705/28 |
| 2004/0215614 | A1 | 10/2004 | Doyle et al. |
| 2004/0220931 | A1 | 11/2004 | Guthridge et al. |
| 2004/0220932 | A1 | 11/2004 | Seeger et al. |
| 2004/0220933 | A1 | 11/2004 | Walker |
| 2005/0021354 | A1 | 1/2005 | Brendle et al. |
| 2005/0080806 | A1 | 4/2005 | Doganata et al. ............ 707/102 |
| 2005/0091663 | A1 | 4/2005 | Bagsby ............... 719/315 |
| 2005/0166187 | A1 | 7/2005 | Das et al. ............... 717/136 |
| 2005/0256961 | A1 | 11/2005 | Alon et al. ............... 709/229 |
| 2005/0262130 | A1 | 11/2005 | Mohan ............... 707/102 |
| 2006/0004757 | A1 | 1/2006 | Watts |
| 2006/0080486 | A1 | 4/2006 | Yan |
| 2006/0095571 | A1 | 5/2006 | Gilgen et al. |
| 2006/0136914 | A1 | 6/2006 | Marascio et al. |
| 2006/0149877 | A1 | 7/2006 | Pearson |
| 2006/0167955 | A1 | 7/2006 | Vertes ............... 707/201 |
| 2006/0218290 | A1 | 9/2006 | Lin et al. |
| 2006/0259911 | A1 | 11/2006 | Weinrich et al. |
| 2006/0282400 | A1 | 12/2006 | Kalavacharla et al. |
| 2007/0226139 | A1 | 9/2007 | Crumbach et al. |
| 2008/0082761 | A1 | 4/2008 | Herness et al. |
| 2008/0091679 | A1 | 4/2008 | Herness et al. |
| 2008/0091712 | A1 | 4/2008 | Daherkar et al. |
| 2008/0148299 | A1 | 6/2008 | Daherkar et al. |

OTHER PUBLICATIONS

Doug Tidwell, Programming Web Services with SOAP, Dec. 2001, O'Reilly, First Edition, 225 pages.*

Ethan Cerami, Web Services Essentials, Feb. 2002, O'Reilly, First Edition, 286 pages.*

Mansouri-Samani, Masoud; Sloman, Morris; "A Configurable Event Service for Distributed Systems," Department of Computing, Imperial College of Science, Technology and Medicine, IEEE, 1996, pp. 210-217.

Meyer, K.; Gas, B.; Doughty, J.; "The Devolution of Functional Analysis," Workpaper, Honeywell Information Systems, Ltd., Oct. 26, 1982, pp. 65-91.

Arpaci-Dusseau, Andrea Carol; "Implicit Coscheduling: Coordinated Scheduling with Implicit Information in Distributed Systems," ACM Transactions on Computer Systems, vol. 19, No. 3, Aug. 2001, pp. 283-331.

Rinard, Martin C.; Diniz, Pedro C.; "Eliminating Synchronization Bottlenecks Using Adaptive Replication," ACM Transactions on Programming Languages and Systems, vol. 25, No. 3, May 2003, pp. 316-359.

Barcia, R. and J. Brent, "IBM WebSphere Developer Technical Journal: Building SOA Solutions with the Service Component Architecture—Part 1", Oct. 26, 2005, Total 46 pp.

Response to Office Action 1, Dec. 16, 2008, for U.S. Appl. No. 11/549,613, filed Oct. 13, 2006 by A.R. Daherkar et al., Total 16 pp.

Response to Final Office Action 1, Jun. 16, 2009, for U.S. Appl. No. 11/549,613, filed Oct. 13, 2006 by A.R. Daherkar et al., Total 13 pp.

Response to Office Action 3, Nov. 15, 2009, for U.S. Appl. No. 11/549,613, filed Oct. 13, 2006 by A.R. Daherkar et al., Total 12 pp.

Appeal Brief, Aug. 3, 2010, for U.S. Appl. No. 11/549,613, filed Oct. 13, 2006 by A.R. Daherkar et al., Total 26 pp.

Examiner's Answer, Oct. 27, 2010, for U.S. Appl. No. 11/549,613, filed Oct. 13, 2006 by A.R. Daherkar et al., Total 37 pp.

Final Office Action 1, Mar. 16, 2009, for U.S. Appl. No. 11/549,613, filed Oct. 13, 2006 by A.R. Daherkar et al., Total 25 pp.

Final Office Action 2, Mar. 3, 2010, for U.S. Appl. No. 11/549,613, filed Oct. 13, 2006 by A.R. Daherkar et al., Total 27 pp.

Notice of Appeal, Jun. 3, 2010, for for U.S. Appl. No. 11/549,613, filed Oct. 13, 2006 by A.R. Daherkar et al., Total 2 pp.

Office Action 1, Sep. 16, 2008, for U.S. Appl. No. 11/549,613, filed Oct. 13, 2006 by A.R. Daherkar et al., Total 32 pp.

Office Action 3, Aug. 17, 2009, for U.S. Appl. No. 11/549,613, filed Oct. 13, 2006 by A.R. Daherkar et al., Total 24 pp.

Reply Brief, Dec. 27, 2010, for U.S. Appl. No. 11/549,613, filed Oct. 13, 2006 by A.R. Daherkar et al., Total 11 pp.

Decision on Appeal (Reversed), May 30, 2014, for U.S. Appl. No. 11/549,613, filed Oct. 13, 2006 by A.R. Daherkar et al., Total 7 pp.

Notice of Allowance, Sep. 2, 2014, for U.S. Appl. No. 11/549,613, filed Oct. 13, 2006 by A.R. Daherkar et al., Total 13 pp.

Office Action 5, May 21, 2015, for U.S. Appl. No. 11/549,613, filed Oct. 13, 2006 by A.R. Daherkar et al., Total 21 pp.

Pre-Interview Office Action 1, Oct. 27, 2008, for U.S. Appl. No. 11/536,962, filed Sep. 29, 2006 by Herness et al., Total 11 pp.

First Action Interview Office Action 1, Dec. 24, 2008, for U.S. Appl. No. 11/536,962, filed Sep. 29, 2006 by Herness et al., Total 8 pp.

Response to Pre-Interview Communication, Nov. 13, 2008, for U.S. Appl. No. 11/536,962, filed Sep. 29, 2006 by Herness et al., Total 8 pp.

Response to Pre-Interview Communication, Dec. 24, 2008, for U.S. Appl. No. 11/536,962, filed Sep. 29, 2006 by Herness et al., Total 8 pp.

Supplemental Amendment, Jan. 8, 2009, for U.S. Appl. No. 11/536,962, filed Sep. 29, 2006 by Herness et al., Total 20 pp.

Final Office Action 1, May 14, 2009, for U.S. Appl. No. 11/536,962, filed Sep. 29, 2006 by Herness et al., Total 42 pp.

Response to Final Office Action 1, Aug. 11, 2009, for U.S. Appl. No. 11/536,962, filed Sep. 29, 2006 by Herness et al., Total 24 pp.

Office Action 4, Dec. 1, 2009, for U.S. Appl. No. 11/536,962, filed Sep. 29, 2006 by Herness et al., Total 39 pp.

Response to Office Action 4, Mar. 1, 2010, for U.S. Appl. No. 11/536,962, filed Sep. 29, 2006 by Herness et al., Total 22 pp.

Final Office Action 2, May 28, 2010, for U.S. Appl. No. 11/536,962, filed Sep. 29, 2006 by Herness et al., Total 49 pp.

Response to Final Office Action 2, Aug. 19, 2010, for U.S. Appl. No. 11/536,962, filed Sep. 29, 2006 by Herness et al., Total 11 pp.

Notice of Allowance 1, Sep. 7, 2010, for U.S. Appl. No. 11/536,962, filed Sep. 29, 2006 by Herness et al., Total 24 pp.

Notice of Allowance 2, Nov. 23, 2010, for U.S. Appl. No. 11/536,962, filed Sep. 29, 2006 by Herness et al., Total 27 pp.

Office Action 1, Nov. 14, 2008, for U.S. Appl. No. 11/536,941, filed Sep. 29, 2006 by Herness et al., Total 18 pp.

Response to Office Action 1, Dec. 8, 2008, for U.S. Appl. No. 11/536,941, filed Sep. 29, 2006 by Herness et al., Total 7 pp.

Notice of Allowance 1, Jan. 14, 2009, for U.S. Appl. No. 11/536,941, filed Sep. 29, 2006 by Herness et al., Total 9 pp.

Amendment 2, Apr. 13, 2009, for U.S. Appl. No. 11/536,941, filed Sep. 29, 2006 by Herness et al., Total 9 pp.

Notice of Allowance 2, May 15, 2009, for U.S. Appl. No. 11/536,941, filed Sep. 29, 2006 by Herness et al., Total 11 pp.

Notice of Allowance 3, Jun. 22, 2009, for U.S. Appl. No. 11/536,941, filed Sep. 29, 2006 by Herness et al., Total 10 pp.

An, Yongli and T.K.T. Lau, "WebSphere and DB2 Clustering and Scalability Study Installation and Configuration Guide", 2002, © International Business Machines Corporation 2002, Total 22 pp.

IBM, "WebSphere Process Server for Multiplatforms Version 6.1.0: Administering WebSphere Process Server", International Business Machines Corporation 2005, 2008, Total 404 pp.

(56) References Cited

OTHER PUBLICATIONS

IBM, "WebSphere Process Server for Multiplatforms Version 6.1.0: Product Overview", International Business Machines Corporation 2005, 2008, Total 72 pp.

"Index of FTP", [online], [Retrieved on Sep. 21, 2015]. Retrieved from the Internet at <URL: ftp://public.dhe.ibm.com/software/websphere/integration/wps/library/infocenter/doc/>, Total 1 p.

IBM, "WebSphere Process Server Library", [online], [Retrieved on Sep. 21, 2015]. Retrieved from the Internet at <URL: http://www-01.ibm.com/software/integration/wps/library/infocenter/>, Total 1 p.

IBM, "WebSphere Process Server Version 6.0.1 Administering WebSphere Process Server", Dec. 23, 2005, © International Business Machines Corporation 2005, Total 338 pp.

IBM, "WebSphere Process Server for Multiplatforms Version 6.0.2 Administering WebSphere Process Server", Dec. 22, 2006, © International Business Machines Corporation 2005, 2006, Total 288 pp.

IBM, "WebSphere Process Server Version 6.0 Administering", Sep. 29, 2005, © International Business Machines Corporation 2005, Total 228 pp.

IBM, "WebSphere Process Server Version 6.0.1 Product Overview", Dec. 23, 2005, © International Business Machines Corporation 2005, Total 44 pp.

IBM, "WebSphere Process Server Version 6.0 Product Overview", Sep. 29, 2005, © International Business Machines Corporation 2005, Total 36 pp.

Response to Decision on Appeal, Jul. 28, 2014, for U.S. Appl. No. 11/549,613, filed Oct. 13, 2006 by A.R. Daherkar et al., Total 8 pp.

Response to Office Action 5, Sep. 21, 2015, for U.S. Appl. No. 11/549,613, filed Oct. 13, 2006 by A.R. Daherkar et al., Total 13 pp.

Final Office Action, Oct. 13, 2015, for U.S. Appl. No. US11/549,613, filed Oct. 13, 2006 by A.R. Daherkar et al., Total 21 pages [57.280 (FOA)].

* cited by examiner

METHOD AND SYSTEM FOR DETECTING WORK COMPLETION IN LOOSELY COUPLED COMPONENTS

BACKGROUND

1. Field

This disclosure generally relates to software integration. More particularly, the disclosure relates to detecting work completion in a software integration environment.

2. General Background

A business integration environment allows a plurality of business applications to work together. In particular, a source enterprise application may be utilized to transmit business data to a target enterprise application. The source enterprise application first sends data to a source adapter component. The source adapter component is a standardized interface that allows the source enterprise application to communicate with process server components. Accordingly, the business data may then be transmitted from the source adapter component to several process server components. Further, the process server components may then transmit the business data to a target adapter component. The target adapter component is a standardized interface that allows the process server components to communicate with the target enterprise application. Finally, the target adapter component may then transmit the business data to the target enterprise application so that the target enterprise application can utilize the business data. Applications, such as external web services, web applications, and java clients can directly invoke process server components that update an enterprise application via the adapter associated with the enterprise application.

The source enterprise application may generate the business data in a particular order. This business data is modeled as one or more business objects, which are instances of a framework for modeling and manipulating data. In one embodiment, the one or more business objects are defined in XML. Further, in one embodiment, java can be utilized to programmatically create instances and programmatically manipulate business data. After creating the customer business object, the source enterprise application may send a series of updates to the customer business object, e.g., a first update and a second update. Accordingly, the target enterprise application should receive the customer business object, the first update, and the second update from the source enterprise application in the same order in which the source enterprise application sent the business data to ensure accurate processing.

A synchronous single threaded environment allows for a target component to return an invoked function, thereby providing an indication to the source component that invoked the method that the target component has completed its use of the function. The source component and the target component are tightly coupled as the source component can both request an invocation on the target computer and receive an indication back from the target computer regarding work completion. Accordingly, the source component is aware of when it can make a subsequent request for another invocation on the target computer. Similarly, other source components, which did not make the initial invocation, that are tightly coupled with the target component can also receive an indication of when the target component has completed the initial work so that they know when the target component is available to perform their requests.

Asynchronous communication does not provide for this type of two-way communication. In asynchronous communication, a source component can send data to a target component and return without having to wait for the data to be processed. Therefore, the source component and the target component are loosely coupled components. For instance, the source component may send an asynchronous message to the target component requesting use of a function. Further, the target computer can process the data at a later time. Accordingly, the source component has no way of knowing when the work by the target component has been completed. Further, other components that are loosely coupled with the target component have no way of knowing if the invocation requested by the source component has been completed by the target component. These other components may be attempting to utilize the target component with respect to the same business data for which the source component requested an invocation from the target component.

The problem is further complicated in an asynchronous multi-threaded environment, which typically allows the processing of messages to be performed in parallel by multiple threads. In a multi-threaded environment, it is possible that one thread can race ahead of another thread and cause the messages to be processed out of order. The processing of the messages is typically performed in parallel by multiple threads. In a multi-threaded environment, it is possible that one thread can race ahead of another thread and cause the messages to be processed out of order. In the example above, a multi-threaded environment would allow the target enterprise application to receive and process the first update prior to creating the customer business object. If the target enterprise application receives the first update prior to creating the customer business object, the target enterprise application has nothing to update. As a result, one or more exceptions may be created in the target enterprise application, which may cause a variety of problems and ultimately lead to errors.

Simply utilizing a synchronous single threaded environment is not a viable solution because such an environment is not scalable. A large number of computing devices will not work optimally in such an environment. Business are generally interested in utilizing batch processing, which allows a series of jobs that do not require any further user input to processed at one time. Accordingly, businesses are more interested in working in an asynchronous multi-threaded environment because of the ability to utilize parallel processing, which allows for greater efficiency with respect to processing such as batch processing.

Specialized components could also be built to ensure that threads are processed in the intended order. However, such an approach is intrusive. In other words, businesses would have to purchase additional software components that would have to be configured to work with existing software technology. Further, the existing software technology may have to be configured to allow for integration of the specialized components. This intrusive configuration may lead to a large expense and loss of valuable productivity time for most businesses.

SUMMARY

In one aspect of the disclosure, a computer program product is disclosed. The computer program product includes a computer useable medium that has a computer readable program. The computer readable program when executed on a computer causes the computer to receive a request from a component to invoke a function. Further, the computer readable program, when executed on a computer, causes the computer to asynchronously perform the function according to the request. In addition, the computer readable program, when executed on a computer, causes the computer to provide, to one or more programs, an indication that the function has completed work according to the request.

In another aspect of the disclosure, a method receives a request from a component to invoke a function. The method asynchronously performs the function according to the request. Further, the method provides, to one or more programs, an indication that the function has completed work according to the request.

In yet another aspect of the disclosure, a method receives an event that requests an invocation of a function from an event sequencing group of functions in a component. The event sequencing group is a subset of a plurality of functions in the component. Further, the method asynchronously performs the function according to the event. In addition, a method provides, to one or more programs, an indication that the function has completed work according to the event so that a lock can be removed from the event.

In another aspect of the disclosure, a system is disclosed. The system has a target component that receives a request from a source component to invoke a function and asynchronously performs the function according to the request. Further, the system has a work completion detection module that provides, to one or more programs, an indication that the function has completed work according to the request.

DRAWINGS

The above-mentioned features and objects of the present disclosure will become more apparent with reference to the following description taken in conjunction with the accompanying drawings wherein like reference numerals denote like elements and in which.

DETAILED DESCRIPTION

Overview

An approach can be utilized to detect the completion of work by loosely coupled application components. Specifically, the completion of work by a target component can be detected by one or more source components in an asynchronous multi-threaded environment.

While this approach can be utilized for various configurations, an example configuration is initially illustrated that involves the ordering of events processed by a target component. A locking mechanism is utilized in this configuration to ensure the order in which the events are to be processed. The detection of work completion can help ensure that a lock is not released too early or too late.

Event Sequencing with an Event Sequencing Qualifier

A non-intrusive approach can be utilized to ensure that events, which are requests or responses that flow through one or more components that make up a system, are received and processed in the intended order. An example of such a system is a purchase order system that creates an event when a user places an order for a product. The purchase order system may also create an event when a user updates the order for the product, e.g., changing the quantity of products ordered. In one embodiment, the event includes metadata such as the name of the target component to be invoked, the operation to be invoked, and the parameters for the invocation and/or the returns from the invocation.

As will be discussed, an event sequencing qualifier can be added to a component to ensure that the business data received by the component is processed in the intended order. In one embodiment, functionality can be added to an existing component by adding the event sequencing qualifier to the definition of the component. As business data may flow through a series of other components before reaching the target enterprise application, an event sequencing qualifier can also be placed in each of these components. As a result, event sequencing that is non-intrusive can be attained in a multi-threaded environment.

For illustrative purposes, the event sequencing approach described herein is utilized in a Service Component Architecture ("SCA"). One of ordinary skill in the art will understand that the principles taught here in can be implemented utilizing any other programming model that allows for asynchronous multi-threading. The SCA is a programming model on which a process server, such as a Websphere process server, can be built. The SCA provides a service oriented view on top of existing J2EE component models and APIs. Each SCA component is defined using the Service Component Definition Language ("SCDL"). Further, components can communicate with one another by utilizing a messaging engine such as the Service Integration Bus ("SIB"). The components communicate by sending and receiving messages to and from SIB destinations.

Figure 1:
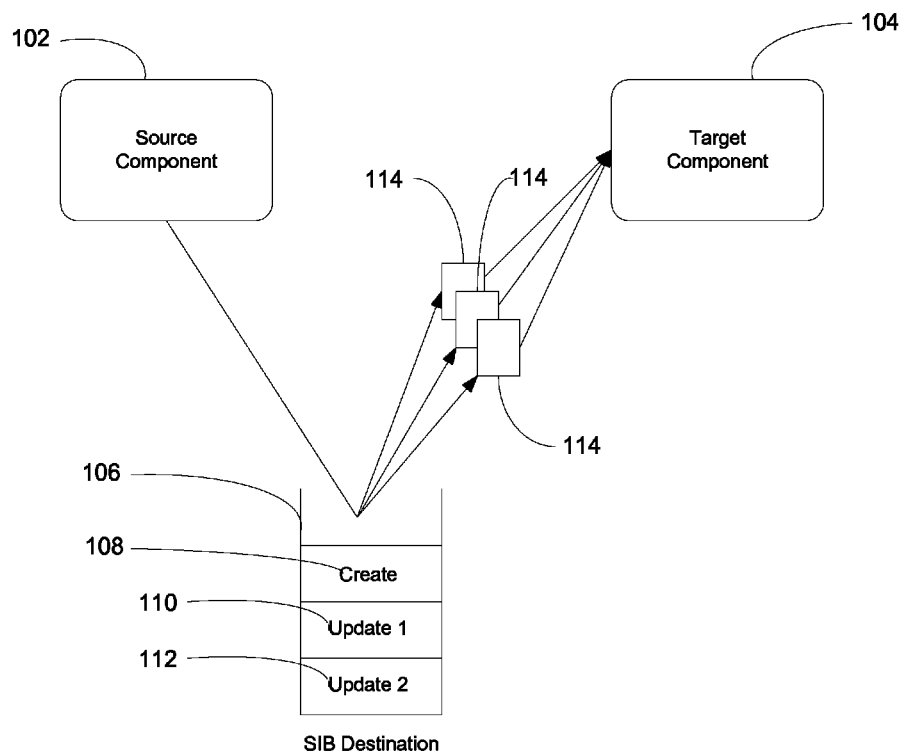
FIG. 1 illustrates a series of components that utilize asynchronous multi-threading.

FIG. 1 illustrates a series of components that utilize asynchronous multi-threading. A source component 102 looks at an interface for a target component 104 to determine what functions are available for the target component 104. The term function is intended to include a method, procedure, or any other similar software module. For example, the target component 104 may have an interface coded in Web Services Description Language ("WSDL") that has methods for business data. The interface for the target component 104 may have a method entitled "create" and a method entitled "update."

Accordingly, if a user purchases a product, the source component 102 can asynchronously invoke the create method of the interface for the target component 104 to create a purchase order. In addition, if the user decides to make a modification to the purchase order, e.g., a change in the quantity of the product purchased, the source component 102 can asynchronously invoke the update method of the interface for the target component 104 to update the purchase order. The user may choose to make multiple updates to the purchase order. Accordingly, the source component 102 would asynchronously invoke the update method multiple times. Each invocation would correspond to a modification of the purchase order by the user. For instance, if the user makes two modifications, the source component 102 invokes a first update with the update method and a second update with the update method.

In one embodiment, the SCA architecture provides for an SIB destination 106 in which a message can be stored for transmission between the source component 102 and the target component 104. In one embodiment, a message can be created for each invocation of a method in the interface of the target component 104 by the source component 102. For instance, the source component 102 can create and send a message 108 for the create invocation, a message 110 for the first update, and a message 112 for the second update. A software module 114 reads each message and transmits the message to the target component 104. In one embodiment, the software module 114 is a message driven bean ("MDB"). Further, multiple instances of the MDB are created to correspond to each message and, thereby, allow for multi-threading and parallel processing. Accordingly, the MDB thread corresponding to the message 110 for the first update or the MDB thread corresponding to the message 112 for the second update may be potentially processed before the MDB thread corresponding to the message 108 for the creation. Further, the MDB thread corresponding to the message 112 for the second update may be potentially processed before the MDB thread corresponding to the message 110 for the first update.

In one embodiment, the use of the event sequencing qualifier involves an event acquiring a lock before the event is dispatched to the target component 104 for execution of business logic. When execution of the business logic at the target component 104 is completed, the event releases the lock. If an event cannot acquire a lock, i.e., because another event has the lock, then execution of the invocation for that event is suspended. At a later point in time, e.g., when the other event releases the lock, the event will be dispatched to the target component 104.

A user can specify that event sequencing is to be implemented for a particular component by providing an event sequencing qualifier for the component. The event sequencing qualifier indicates to the runtime application that invocations to one or more operations should be sequenced. The sequencing is performed based on event sequencing key that is specified as part of the event sequencing qualifier.

XML can be utilized to provide the schema for the event sequencing qualifier in the function. An example XML schema for an event sequencing qualifier is:

```
<?xml version="1.0" encoding="UTF-8"?>
<schema xmlns="http://www.w3.org/2001/XMLSchema"
xmlns:es="http://www.ibm.com/xmlns/prod/websphere/wbiserver/eventSequencing/6.0.0"
xmlns:scdl="http://www.ibm.com/xmlns/prod/websphere/scdl/6.0.0"
targetNamespace="http://www.ibm.com/xmlns/prod/websphere/wbiserver/eventSequencing
/6.0.0">
<import
      namespace="http://www.ibm.com/xmlns/prod/websphere/scdl/6.0.0"
      schemaLocation="scdl.xsd" />
   <!-- Event sequencing Qualifier -->
   <!-- We may not need following substitutionGroup. Added it to follow the way SCA
defined its qualifiers -->
   <element name="eventSequencingQualifier" type="es:EventSequencingQualifier"
substitutionGroup="scdl:interfaceQualifier"/>
   <complexType name="EventSequencingQualifier">
      <complexContent>
         <extension base="scdl:InterfaceQualifier">
            <sequence>
            <element name="eventSequencing" type="es:EventSequencing"/>
            </sequence>
         </extension>
      </complexContent>
   </complexType>
   <complexType name="EventSequencing">
      <sequence>
         <element name="keySpecification" type="es:KeySpecification"/>
      </sequence>
      <attribute name="sequencingGroup" type="string" default="default"/>
      <attribute name="continueOnError" type="boolean" default="true"/>
   </complexType>
   <complexType name="KeySpecification">
      <sequence maxOccurs="unbounded">
         <element name="parameter" type="Parameter"/>
      </sequence>
   </complexType>
   <complexType name="Parameter">
      <sequence minOccurs="0" maxOccurs="unbounded">
         <!-- xpath not required for Simple Types -->
         <element name="xpath" type="string"/>
      </sequence>
      <attribute name="name" type="string" use="required"/>
   </complexType>
```

In one embodiment, the event sequencing qualifier is provided to the component by adding an event sequencing qualifier to the method in the definition of the component. An example of a component definition with an event sequencing qualifier that is built upon the SCA standard is provided:

```xml
<?xml version="1.0" encoding="UTF-8"?>
<scdl:component xmlns:xsi="http://www.w3.org/2001/XMLSchema-instance"
xmlns:ns1="http://EventS/ProcessOrder"
xmlns:es=http://www.ibm.com/xmlns/prod/websphere/wbiserver/eventSequencing/6.0.0
xmlns:scdl="http://www.ibm.com/xmlns/prod/websphere/scdl/6.0.0"
xmlns:wsdl="http://www.ibm.com/xmlns/prod/websphere/scdl/wsdl/6.0.0"
displayName="Component1" name="Component1">
    <interfaces>
        <interface xsi:type="wsdl:WSDLPortType" portType="ns1:ProcessOrder">
            <method name="create">
            <scdl:interfaceQualifier xsi:type="es:EventSequencingQualifier">
            <es:eventSequencing sequencingGroup="default" continueOnError="true">
                    <keySpecification>
                        <parameter name="newOrder">
                            <xpath>id</xpath>
                    </parameter>
                </keySpecification>
            </es:eventSequencing>
            </scdl:interfaceQualifier>
        </method>
         <method name="update"/>
        <scdl:interfaceQualifier xsi:type="es:EventSequencingQualifier">
        <es:eventSequencing sequencingGroup="default" continueOnError="true">
                <keySpecification>
                    <parameter name ="newOrder">
                        <xpath>id</xpath>
                </parameter>
            </keySpecification>
        </es:eventSequencing>
        </scdl:interfaceQualifier>
        <method name="retrieve"/>
    </interface>
</interfaces>
</scdl:component>
```

The sequencingGroup attribute groups related operations that should be sequenced together. Further, KeySpecification defines the key that will be used to identify the events that need to be sequenced. In one embodiment, one KeySpecification is provided per method. The name attribute is the name of the parameter and the xpath specified is applied to the parameter to extract a value that will be part of the key. A user can specify a parameter element for each parameter that is going to contribute to the key.

For the create method, the key is constructed from the id attribute of the parameter newOrder. Since create and update are in the same group, if an invocation of create holds on to a lock, then an invocation of update will be suspended until a lock can be acquired.

In one embodiment, the invocation can have parameters which are business objects. Further, the event sequencing key can be a combination of business object attributes.

An example of a business object can be a purchase order. The purchase order business object can have business object attributes such as id, customer, product name, and quantity. The following schema is an example of code that can be utilized for the purchase order business object:

```xml
<?xml version="1.0" encoding="UTF-8"?>
<xsd:schema xmlns:xsd="http://www.w3.org/2001/XMLSchema"
targetNamespace="http://EventS">
    <xsd:complexType name="Order">
        <xsd:sequence>
            <xsd:element minOccurs="0" name="id" type="xsd:string"/>
            <xsd:element minOccurs="0" name="customername"
            type="xsd:string"/>
            <xsd:element minOccurs="0" name="productname"
            type="xsd:string"/>
            <xsd:element minOccurs="0" name="quantity" type="xsd:int"/>
        </xsd:sequence>
    </xsd:complexType>
</xsd:schema>
```

In one embodiment, the event sequencing runtime program sequences events having the same event sequencing key. For example, the event sequencing key can be the id attribute. The id attribute for each event will be determined. Each subset of events having the same id attribute is event sequenced. For example, event qualifiers may be established in the definition of the target component 104 such that the create and update methods are to have event sequencing for events requesting the create and/or update methods that have the same event sequencing key, i.e., the same id attribute. If a user purchases a first and a second product, events related to the first product will have an event sequencing key of one (the id of the first product) and events related to the second product will have an event sequencing key of two (the id of the second product). For instance, a first invocation may call the create method to create a purchase order for the first product. The id for the first invocation equals one and the quantity can equal ten to reflect that the user wants ten of the first product. The first invocation requests processing and receives a lock since there are no other invocations with having the same event sequencing key, i.e., an id equaling one. A second invocation may call the update method for the first product to reflect that the user would like to change the quantity ordered from ten to fifteen. However, the second invocation is unable to be processed while the first invocation (which has the same event sequencing key, i.e. an id equaling one, as the second invocation) holds the lock. The execution of the second invocation is suspended. Once the first invocation is finished processing, the first invocation can release the lock and allow the second invocation to acquire the lock so that it can be processed. In one embodiment, the runtime application detects completion by the first invocation and releases the lock from the first invocation to provide it to the next invocation having the same event sequencing key that requested the lock, i.e., the second invocation. Execution of the second invocation can then resume. Accordingly, events that should be performed in a particular order are isolated to ensure a proper sequence. As a result, exceptions in target components (which can lead to losses in productivity, efficiency, etc.) can be avoided.

A set of events having a different event sequencing key from another set of events can be processed in parallel to enhance the efficiency of a system. In the example above, a third invocation may call the create method to create a purchase order for the second product. The id equals two and the quantity can equal six to reflect that the user would like to purchase six of the second product. As the third invocation has a different event sequencing key than the first invocation, i.e. the first invocation has an id equaling one and the third invocation has an id equaling two, and there is no other invocation having the same event sequencing key and a lock, the third invocation is not prevented from being processed and acquires a lock. A fourth invocation may call the update method to reflect a change to the customer's order for the second product. The id equals two and the quantity can equal twelve to reflect the customer's modification to purchase twelve of the second product. However, the fourth invocation is prevented from being processed until the invocation with the same event sequencing key and a lock, i.e., the third invocation, is finished being processed and releases the lock. The execution of the fourth invocation is suspended. In one embodiment, the runtime application detects completion by the third invocation and releases the lock from the third invocation to provide it to the next invocation having the same event sequencing key that requested the lock, i.e., the fourth invocation. Execution of the fourth invocation can then resume.

In another embodiment, the event sequencing runtime program sequences events that (1) have the same event sequencing key and (2) are in the event sequencing group. An event sequencing group is a group of functions whose events should be sequenced together. If these events are not sequenced together, errors may occur. As discussed above, the create and update methods should be performed in a particular order to avoid exceptions in target components. However, the order of execution of other methods in the component may not have an impact on the performance of the system. For example, the target component 104 may have a method entitled retrieve in addition to the create and update methods. A user may utilize the retrieve method to view some business data, but ultimately the time at which the user views the business data may not have an impact on the creation or updating of a purchase order. Accordingly, the retrieve method may not be declared as part of the event sequencing group where as the create and update methods are declared as part of the event sequencing group. As a result, a subsequent call to the retrieve method for the first product may be processed before an initial call to the retrieve method for the first product even though event sequencing is utilized for the create and update methods.

Figure 2:
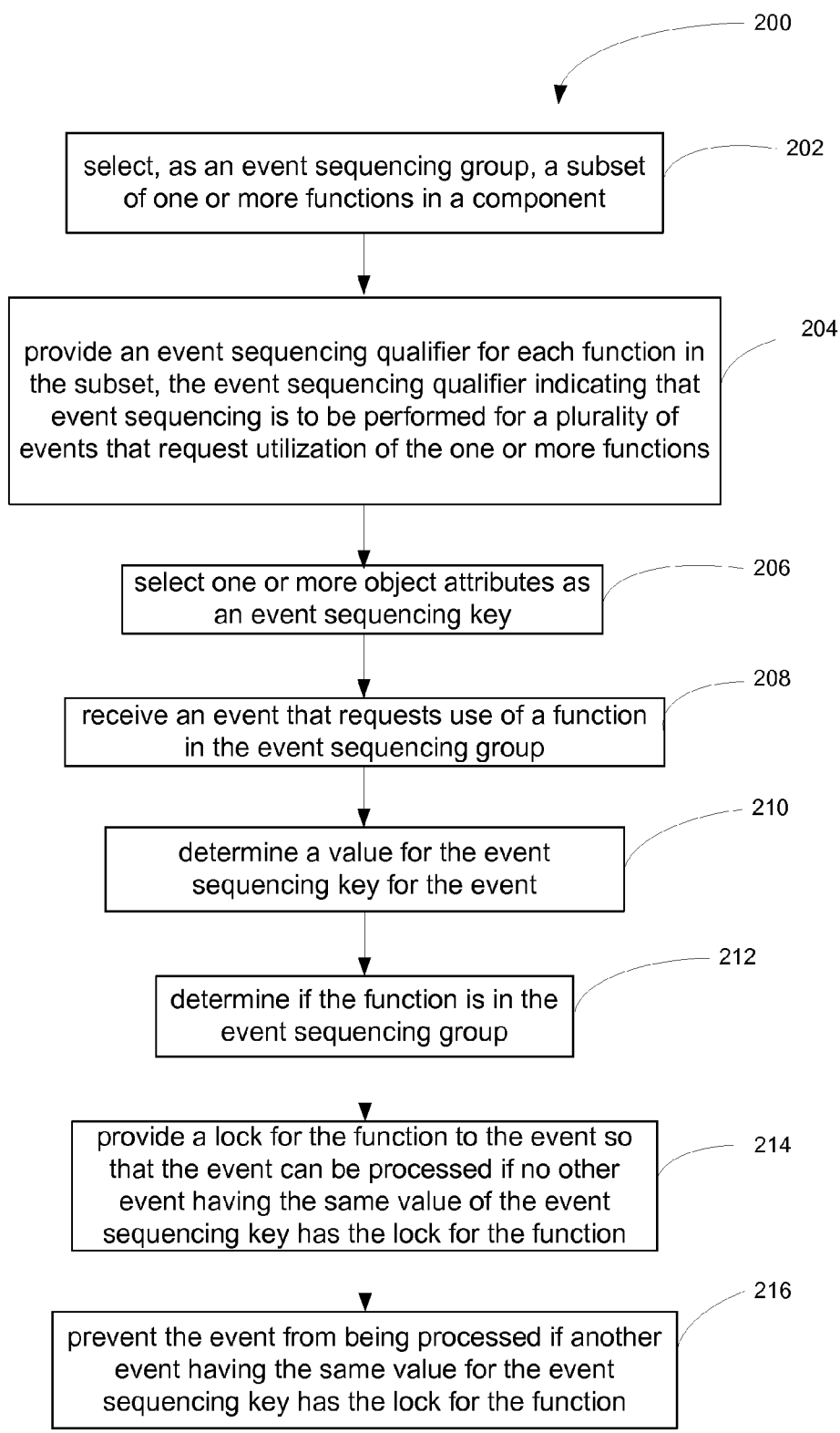
FIG. 2 illustrates a process that utilizes an event sequencing qualifier.

FIG. 2 illustrates a process 200 that utilizes an event sequencing qualifier. At a process block 202, the process 200 selects, as an event sequencing group, a subset of one or more functions in a component. In the example above, the one or more functions may be the create, update, and retrieve methods. For example, the process 200 may select the create and update methods to be included in the event sequencing group, but not the retrieve method, because the ordering of operations for the create and update methods may have an impact on the performance of the system. In one embodiment, the subset may include all of the functions defined in the component, e.g., the create, update, and retrieve methods. Further, at a next process block 204, the process 200 provides an event sequencing qualifier for each function in the subset. The event sequencing qualifier indicates that event sequencing is to be performed for a plurality of events that request utilization of the one or more functions. In another embodiment, the process 200 can provide the event sequencing qualifier without additional components. In other words, the process 200 is non-intrusive as businesses do not have to purchase or build additional components to perform event sequencing. The event sequencing qualifier can be added to a preexisting definition of each function in the component without interfering with the operation or altering the code in the preexisting definition. Further, the event sequencing qualifier is removable from the definition of each function in the component without interfering with the operation or altering the code in the preexisting definition. In addition, the event sequencing qualifier can be added at any point within a system, as opposed to fixed points such as adapters. The event sequencing qualifier can be added to any component within the system. For instance, if components are built utilizing SCA, the event sequencing qualifier can be added to the definition of any component in the system.

At a next process block 206, the process 200 selects one or more object attributes as an event sequencing key. In the example above, the product id object attribute was selected as the event sequencing key. However, a combination of object attributes, e.g., product id and purchaser name, could have been utilized as the event sequencing key. Further, at a next process block 208, the process 200 receives an event that requests use of a function in the event sequencing group. In the example above, the process 200 may receive an event requesting the update method. In addition, at a next process block 210, the process 200 determines if the function is in the event sequencing group. At a next process block 212, the method 200 also determines a value for the event sequencing key for the event. For example, the event may request an update for the first product, i.e., an event sequencing key having a value that equals one. At a next process block 214, the process 200 provides a lock for the function to the event so that the event can be processed if no other event having the same value of the event sequencing key has the lock for the function. For example, the event requesting the update method for the first product can obtain a lock if there are no other events requesting an operation on the first product that have a lock, e.g., an invocation for the create method or another invocation of the update method. Further, at a next process block 216, the process 200 prevents the event from being processed if another event having the same value for the event sequencing key has the lock for the function. In the example above, an invocation for the first product was attempted when an invocation for the first product to the create method had a lock so that an exception at the target component 104 was avoided.

In another embodiment, the target component 104 can receive a flow control attribute that enhances the quality of service. The flow control attribute can indicate an amount of data flow that the target component 104 should receive within a given time period. Further, in yet another embodiment, the target component 104 can receive a filter attribute that indicates a filter for business data that the target component 104 is to receive. For instance, the filter attribute may indicate a maximum price value for products whose orders the target component 104 should process.

Figure 3:
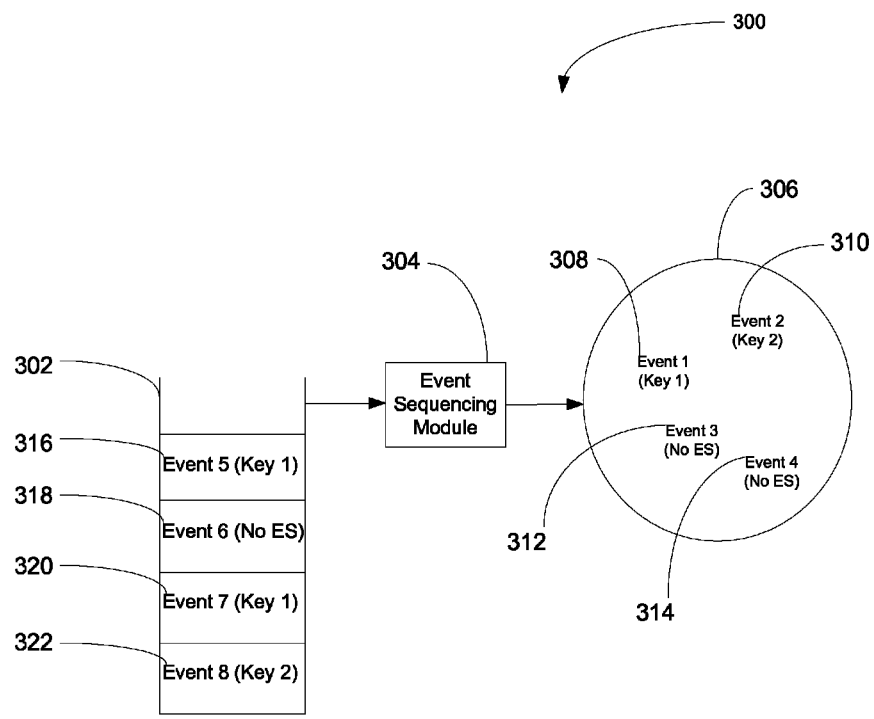
FIG. 3 illustrates an event sequencing configuration.

FIG. 3 illustrates an event sequencing configuration 300. A repository 302 holds events that are waiting to obtain a lock, if needed, to be processed. An example of the repository 302 is the SIB destination 106. An event sequencing module 304 provides a lock to an event if the lock is available and allows the event to be processed on a worker server 306. The event sequencing module 304 can provide computer code to perform this operation. For example, a first event 308 obtained a lock and is being processed in the worker server 306. The first event has Key1 and was not prevented from obtaining a lock because no other event having Key1 had a lock at the time that the first event 308 requested a lock from the event sequencing module 304. The lock allowed the first event 308 to be processed in the worker server 306. Further, a second event 310 has Key2 and was able to obtain a lock because the first event 308 has a different key and no other event with Key2 had a lock at the time that the second event 310 requested a lock. The second event 310 may have even requested the same function as the first event 308, but parallel processing can still occur because the event sequencing key is different. Accordingly, the first event 308 and the second event 310 can be processed in parallel in the worker server 306. Further, a third event 312 and a fourth event 314 are events which request functions that the event sequencing module 304 determines to not be part of an event sequencing group. Therefore, the event sequencing module 304 determines that no event sequencing ("ES") is to be performed for the third event 312 and the fourth event 314, and allows the third event 312 and the fourth event 314 to be processed, in parallel with each other and the first event 308 and the second event 310, in the worker server 306.

The repository 302 holds a fifth event 316 which has an event sequencing key value of Key1. Accordingly, the event sequencing module 304 prevents the fifth event 316 from entering the worker server 306 to be processed because the first event 308 holds a lock for Key1. Further, the repository 302 holds a sixth event 318 which requests a function that is not in the event sequencing group. Accordingly, the event sequencing module 304 allows the sixth event 318 to proceed to the worker server 306 for processing while still suspending the first event 308. In addition, the repository holds a seventh event 320 which has an event sequencing key value of Key1. As with the fifth event 316, the seventh event 320 is suspended in the repository 302 because the first event 308 has a lock. The repository also holds an eighth event 322 which has an event sequencing key value of Key2. The eighth event 322 is suspended n the repository 302 because the second event 310 has a lock.

In one embodiment, the event sequencing module 304 detects the completion of the processing of events in the worker server 306 to release a lock from an event and provide it to another event that has the same key and is suspended in the repository 302. For instance, if the second event 310 is the first to complete processing, the event sequencing module 304 detects completion and releases the lock from the second event 310 to provide it to the eighth event 322. Accordingly, the eighth event 322 is allowed to enter the worker server 306 for processing event though the fifth event 316 and the seventh event 320 made earlier requests because the first event 308 has not completed processing so that the lock for Key1 can be released to the fifth event 316 or the seventh event 320. Once the first event 308 completes processing, the lock is released and provided to the fifth event 316 as the fifth event 316 made an earlier request than the seventh event 320.

In one embodiment, the event sequencing module includes a lock manager. The lock manager is an event sequencing runtime internal component that manages locks for the event sequencing runtime. Further, the lock manager is a persistent lock manager in that the locks are persisted to a database. Persisting the lock ensures that the lock continues to exist after a server crashes and restarts. In addition, the lock manager queues lock request for the same lock in the order of the lock requests. The lock manager can provide a lock operation, which saves the lock request to the database and returns true if the lock is acquired. If the lock cannot be acquired, the request is still saved to the database, but the method returns false. Further, the lock manager can provide an unlock operation, which deletes the current lock and grants the lock to the next lock request. Granting a lock involves resuming the invocation associated with the lock.

Figure 4:
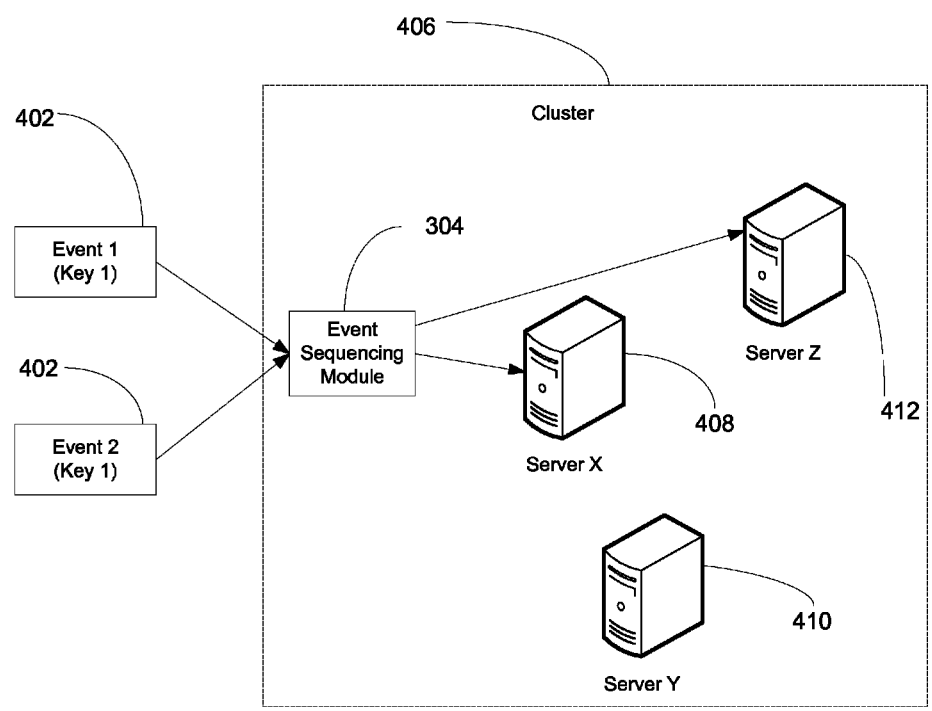
FIG. 4 illustrates a configuration in which event sequencing is utilized for a cluster of servers.

FIG. 4 illustrates a configuration in which event sequencing is utilized for a cluster of servers. The servers in a cluster are clones of one another. A cluster is often utilized by large web sites that receive many request for functions on a server. To increase throughput, these web sites have many servers with the same component. Accordingly, clustering is utilized in many commercial applications to provide scalability and handle large volumes of traffic.

A first event 402 and a second event 404 may have the same key and request functions for a component that is cloned on different servers in a cluster 406. For instance, the first event 402 may be a request to utilize the create method and the second event 404 may be a request to utilize the update method. The cluster 406 may dispatch the first event 402 to the cloned version of the target component deployed on a server Z 412 while the cluster 406 may dispatch the second event 404 to the cloned version of the target component deployed on a server X 408. Accordingly, one server could perform an operation on business data irrespective of the other server's operation on the business data. As a result, the second event 404 could be processed before the first event 402, which would lead to an exception at the server Z 412 because an update would be performed on business data that has not been created yet.

The cluster 406 can utilize the event sequencing module 304 to intercept events before the events are distributed to the servers in the cluster 406. As in the case of a single server, the event sequencing module 304 provides a lock to an event before the event is allowed to be dispatched to the worker server for processing.

The cluster 406 may include a larger number of servers. For illustrative purposes, a server Y 410 is shown in FIG. 4 to demonstrate that other servers may not be utilized by a particular set of events in an event sequencing group.

Further, the process 200 can be utilized in a clustered environment. The component can be provided on a plurality of different servers in the cluster 406. Further, the process 200 provides a lock for the function to the event so that the event can be processed if no other event having the same value of the event sequencing key has the lock for the function on any one of the servers in the cluster. In addition, the process 200 prevents the event from being processed if another event having the same value for the event sequencing key has the lock for the function on any one of the servers in the cluster.

In one embodiment, a High Availability ("HA") manager can be provided to so that a single point of failure can be avoided for the event sequencing module 304. Whether a cluster or a single worker server is utilized, the event sequencing module 304 can read messages from one or more destinations as a singleton. In the event of a crash, the HA manager ensures that the event sequencing module 304 can continue to operate as a singleton on another server.

Figure 5:
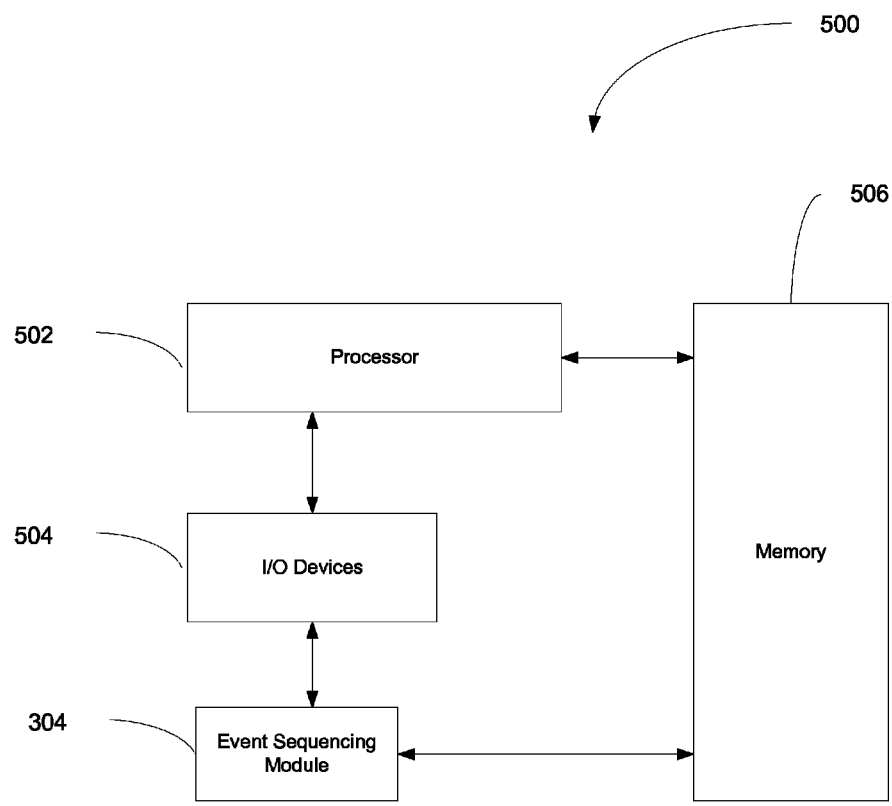
FIG. 5 illustrates a block diagram of a system that utilizes event sequencing with an event sequencing qualifier.

FIG. 5 illustrates a block diagram of a system 500 that utilizes event sequencing with an event sequencing qualifier. In one embodiment, the system 500 is suitable for storing and/or executing program code and is implemented using a general purpose computer or any other hardware equivalents. Thus, the system 500 comprises a processor 502, a memory 506, e.g., random access memory ("RAM") and/or read only memory ("ROM"), the event sequencing module 304, and various input/output devices 504.

The processor 502 is coupled, either directly or indirectly, to the memory 506 through a system bus. The memory 506 can include local memory employed during actual execution of the program code, bulk storage, and/or cache memories which provide temporary storage of at least some program code in order to reduce the number of times code must be retrieved from bulk storage during execution.

The input/output devices 504 can be coupled directly to the system 500 or through intervening input/output controllers. Further, the input/output devices 504 can include a keyboard, a keypad, a mouse, a microphone for capturing speech commands, a pointing device, and other user input devices that will be recognized by one of ordinary skill in the art. Further, the input/output devices 404 can include a receiver, transmitter, speaker, display, image capture sensor, biometric sensor, etc. In addition, the input/output devices 404 can include storage devices such as a tape drive, floppy drive, hard disk drive, compact disk ("CD") drive, etc.

Network adapters may also be coupled to the system 500 to enable the system 500 to become coupled to other systems, remote printers, or storage devices through intervening private or public networks. Modems, cable modems, and Ethernet cards are just a few of the currently available types of network adapters.

It should be understood that the method and system described herein can take the form of an entirely hardware embodiment, an entirely software embodiment, or an embodiment containing both hardware and software elements. If software is utilized to implement the method or system, the software can include but is not limited to firmware, resident software, microcode, etc.

Further, the method and/or system can take the form of a computer program product accessible from a computer-usable or computer-readable medium providing program code for use by or in connection with a computer or any instruction execution system. For the purpose of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a RAM, a ROM, a rigid magnetic disk and an optical disk. Current examples of optical disks include CD-read only memory ("CD-ROM"), CD-read/write ("CD-R/W") and DVD.

Detection of Work Completion

Figure 6:
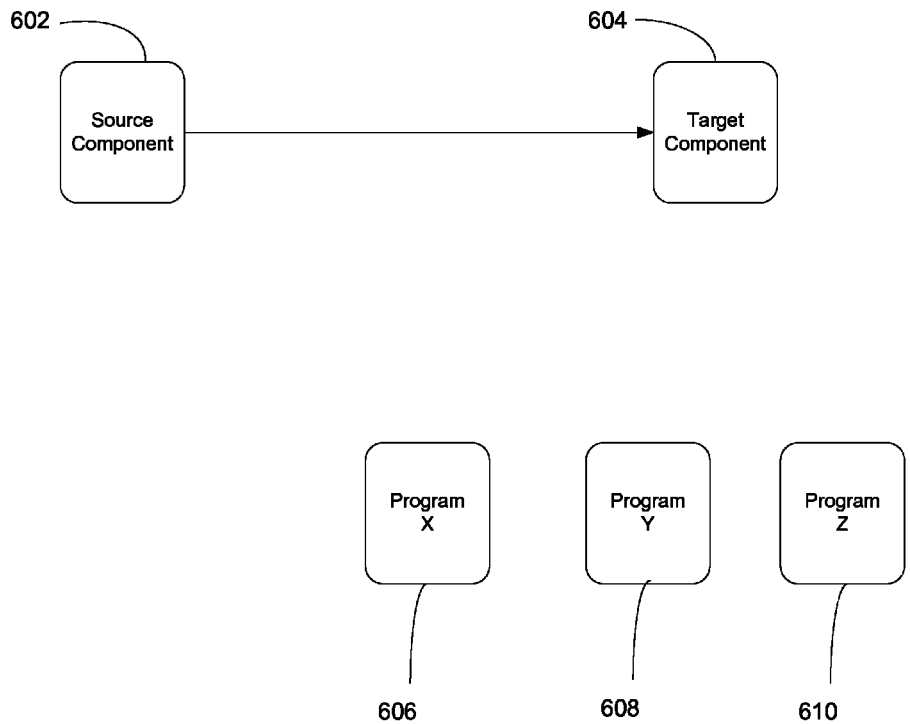
FIG. 6 illustrates an asynchronous multi-threaded configuration for loosely coupled components.

FIG. 6 illustrates an asynchronous multi-threaded configuration for loosely coupled components. A source component 602 sends a request to a target component 604 to invoke a function in the target component 604. The source component 602 and the target component 604 are loosely coupled. As the configuration is asynchronous, the source component 602 transmits a one-way request to the target component 604. Accordingly, the source component 602 does not know when, or event if, the request has been completed by the target component 604. Further, a plurality of programs, e.g., a program X 606, a program Y 608, and a program Z 610, may be waiting for an indication that the invocation, on data, requested by the source component 602 has been completed so that they can make their own requests for invocations that are related to the same data. For example, the program X 606 may be an event sequencing runtime application that is associated with the source component 602. If the source component 602 requests use of the create function for an event with an event sequencing key value equaling one, the event sequencing runtime application provides a lock to that event. However, the event sequencing runtime application has no way of knowing when the target component 604 has completed the use of the create function. Accordingly, the event sequencing runtime application does not know when it should release the lock given to the event. The event sequencing runtime application may thus release the lock too soon, which would allow the event sequencing runtime application to grant the lock to another event having the same event sequencing key value, e.g., an event requesting use of the update function with an event sequencing key value equaling one. In this instance, the event requesting use of the update function may race ahead of the event that requested use of the create function, thereby potentially leading to events being processed out of order and a possible error. The event sequencing runtime application may also release the lock too late, which would allow the event sequencing runtime application to unnecessarily prevent an event such as the event requesting the update function. As a result, system performance may be degraded.

Figure 7:
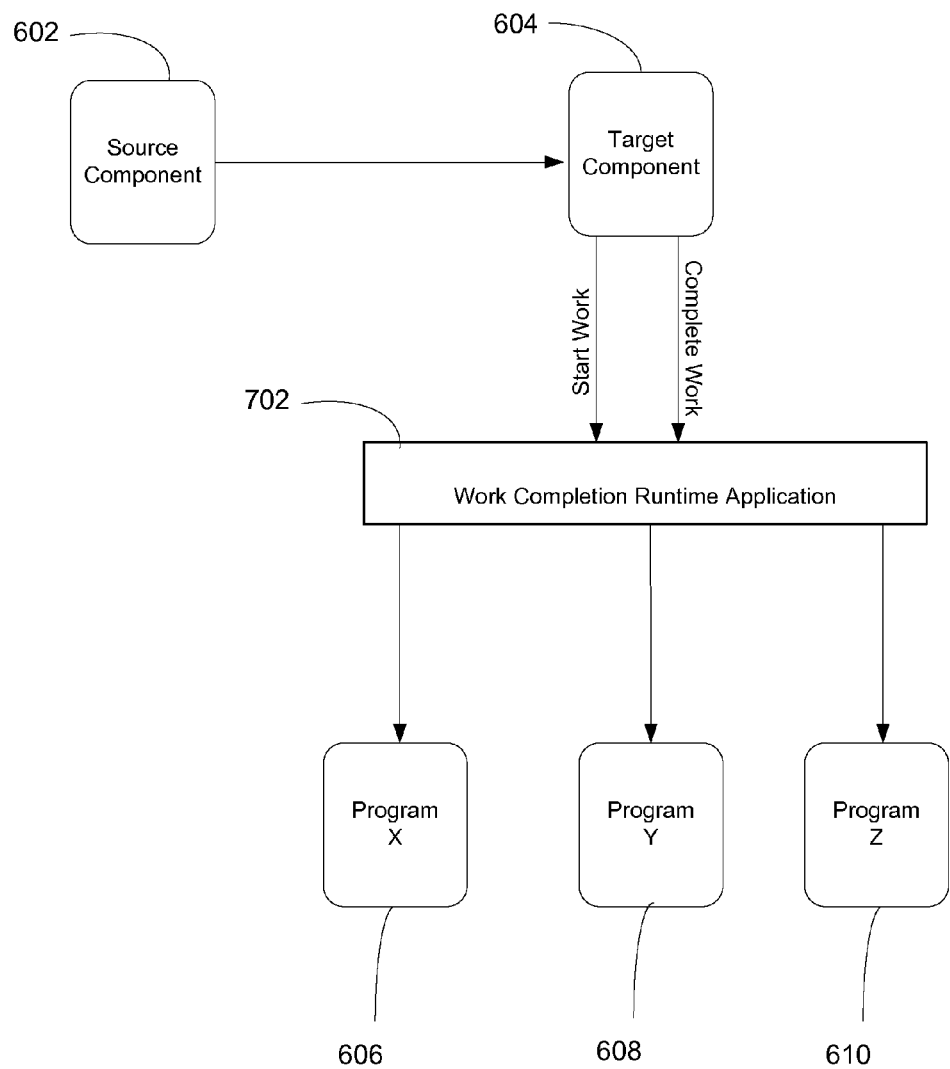
FIG. 7 illustrates a configuration which detects work completion in an asynchronous multi-threaded environment.

FIG. 7 illustrates a configuration which detects work completion in an asynchronous multi-threaded environment. A work completion detection runtime application 702 detects when work has been completed by the target component 604. In one embodiment, the target component 604 is provided with a reference to the interface for the work completion detection runtime application 702. The work completion detection runtime application 702 has functions for indicating the start of work and the completion of work. Accordingly, the target component calls the function to indicate the start of work prior to beginning work on a particular invocation requested by the source component 602. The work completion detection runtime application 702 stores metadata related to the target component 604 and metadata related to the particular invocation. Once the target component 604 has completed work the target component 604 provides calls the function to indicate that work has been completed. As a result, the work completion detection runtime application 702 provides notification to the programs interested in the completion of the work, e.g., the program X 606, the program Y 608, and the program Z 610, that work has been completed, that the work for the particular invocation has been completed.

In the example above, the source component 602 sends a message, which has an event that has an event sequencing key value equaling one and requests the create function, to the target component 604. Prior to the source component 602 sending the message, a reference can be given to the target component 604 for the event sequencing runtime application 702. Accordingly, once the target component 604 receives the event and begins processing the event, the target component 604 can invoke the function in the event sequencing runtime application 702 to indicate that work has begun for the invocation of the event having the event sequencing key value equaling one and requesting the create function. An indication that work has begun and the information regarding the invocation can be provided to the program X 606, the program Y 608, and the program Z 610. Further, once work for the particular invocation has completed, the event sequencing runtime application 702 can invoke the function in the event sequencing runtime application 702 to indicate that work has been completed for the invocation of the event having the event sequencing key value equaling one. An indication that work has been completed and the information regarding the invocation can be provided to the program X 606, the program Y 608, and the program Z 610. If the program X 606 is the event sequencing runtime application, the event sequencing runtime application can receive an indication when the target component 604 has completed work for the event having the event sequencing key value equaling one and requesting the create function. Accordingly, the event sequencing runtime application can remove the lock from the event having the event sequencing key value equaling one and requesting the create function, and grant the lock to the next event with the same event sequencing key value that was suspended from being processed, e.g. the event having the event sequencing key value equaling one and requesting the update function. As a result, the event sequencing runtime application does not release the lock too early or too soon, and can efficiently perform event sequencing with an event sequencing qualifier.

The event sequencing runtime application is just one example of a program that can utilize the notification of work completion. For instance, the program Y 608 and the program Z 610 may be associated with components other than the source component 602 that have an interest in detecting completion of work by the target component 604 for a particular invocation.

In one embodiment, the work completion runtime application 702 is a work completion contract between the target component 604 and the plurality of programs, e.g., the program X 606, the program Y 608, and the program Z 610. The work completion contract can be defined by an interface. An example of such an interface is provided below:

cation to the program X 606, the program Y 608, and the program Z 610 that work has completed.

In the example above in which the program X 606 is the event sequencing runtime application, a work completion contract can be established between the target component 604 and the event sequencing runtime application to detect work completion. The event sequencing runtime application can provide a lock to the event which the source component 602 sends to the target component 604, e.g., the event having an event sequencing value equaling one and requesting the create method. When the target component 604 begins work on the event, the target component 604 can call the startWork method in the interface provided above. When the target component 604 has completed work on the event, the target component 604 can call the endWork method. In one embodiment, the endWork method calls the event sequencing runtime application so that the event sequencing runtime application releases the lock held by the current event and grants the lock to the next event with the same event sequencing key value, e.g., the event having an event sequencing key value that equals one and that requests the update method.

In one embodiment, the event sequencing runtime application works with the target component 604 to detect work completion. In addition, the event sequencing runtime application utilizes SCA and Websphere Business Integration ("WBI") session components to implement the work completion handling logic. Any metadata associated with an event,

```
package com.ibm.wbiserver.sequencing.wcc;
/**
 *
 *
 * The work completion contract interface is used to inform the BaseWCCHandler
 * about the beginning and completion of an operation.
 */
public interface WorkCompletionContract {
    public static final int WORK_COMPLETED = 0;
    public static final int WORK_FAILURE = 1;
    /**
     * singleton instance of WorkCompletionContract implementation
     */
    public static final WorkCompletionContract INSTANCE = new
BaseWCCHandler( );
    /**
     * Called by an implemntation to signal begining of work.
     *
     */
    public void startWork( );
    /**
     * Called by an implmentation to signal work completion. This does not mean that
     compensation is applied.
     * @param completionStatus
     * @param errorMsg
     */
    public void completeWork(int completionStatus, String errorMsg);
    /**
     * Called by an implmentation to signal end of work. This should be called after
applying
     * compensation if any.
     */
    public void endWork( );
}
```

The target component 604 should get a reference to this interface form the public field INSTANCE. The target component 604 calls the startWork method before beginning work. The runtime for the work completion contract can store metadata related to the target component 604 and metadata related to the particular invocation. The target component 604 can then perform the work asynchronously. Once the work has completed, the target component 604 can call the completeWork or endWork methods which can provide an indie.g., an event sequencing key value, can be stored in a session. The session preserves the metadata across invocations and is stored in a location in memory. When the startWork method is called, a flag is set in the session to indicate that the work for a particular event has begun. When the target component 604 determines work is over for the particular event, the target component 604 invokes the endWork method and the event sequencing runtime application obtains the appropriate metadata from the session. The event sequencing runtime application utilizes that metadata to release the lock from the event and possibly grant the lock to another event having the same event sequencing key value.

Figure 8:
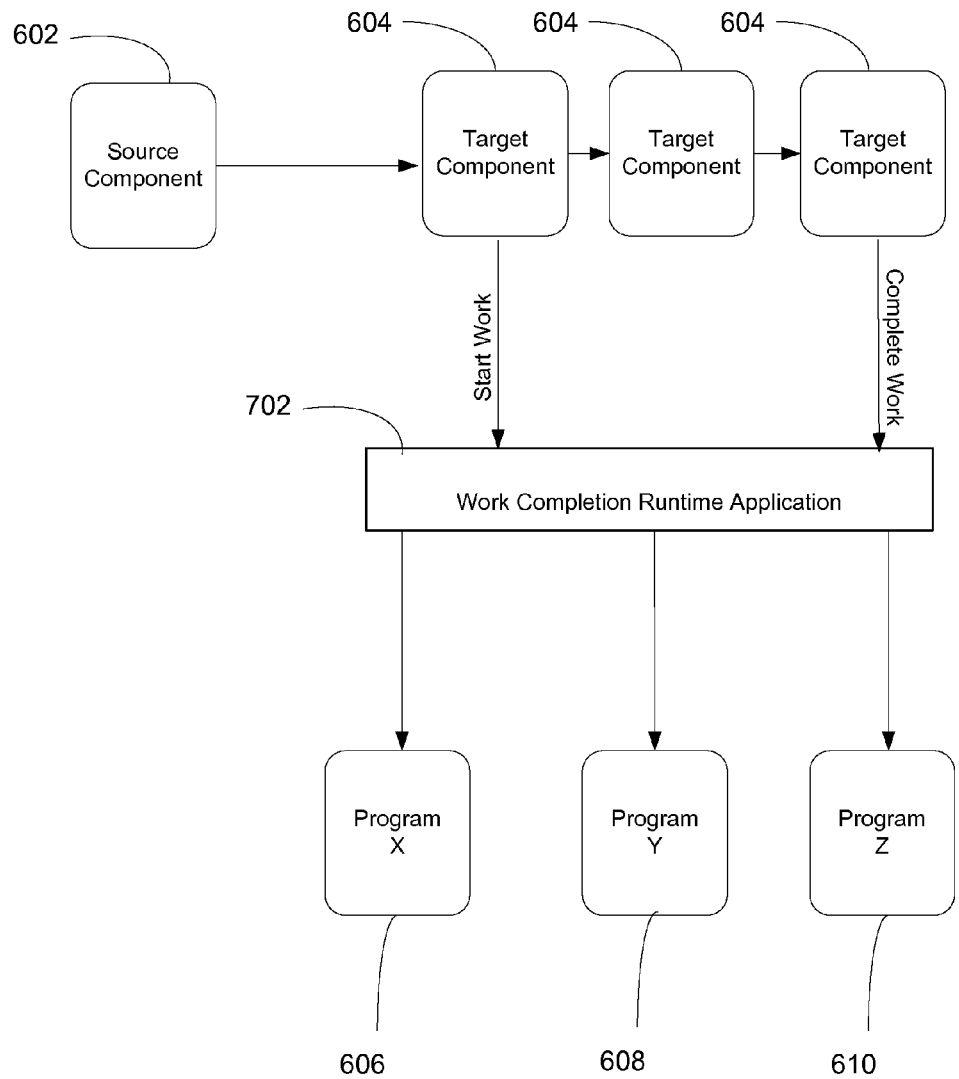
FIG. 8 illustrates the configuration of FIG. 7 in which work spans multiple target components, and the multiple target components can be utilized for work completion detection.

FIG. 8 illustrates the configuration of FIG. 7 in which work spans multiple target components 604, and the multiple target components 604 can be utilized for work completion detection. A unit of work can begin in one of the target components 604 and end in another of the target components 604. For instance, one of the target components 604 can be utilized to call the startWork method while another one of the target components 604 can be utilized to call the completeWork method.

Figure 9:
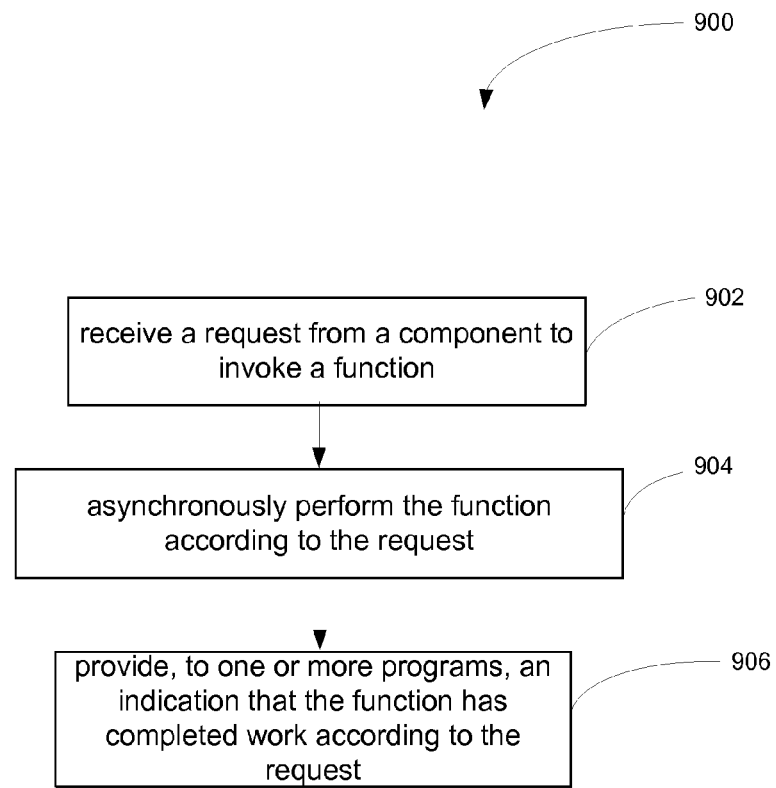
FIG. 9 illustrates a process for work completion detection.

FIG. 9 illustrates a process 900 for work completion detection. At a process block 902, the process 900 receives a request from a component to invoke a function. In another embodiment, the process 900 can provide, to the one or more programs, an indication that the function has begun work according to the request. Further, at a process block 904, the process 900 asynchronously performs the function according to the request. Finally, at a process block 906, the process provides, to one or more programs, an indication that the function has completed work according to the request.

In another embodiment, the process 900 can provide, to the one or more programs, an indication that the function has begun work according to the request. In yet another embodiment, the process 900 can establish a work completion contract with the one or more programs to provide the indication that the function has completed work according to the request. In another embodiment, the one or more programs include an event sequencing runtime application. Further, the event sequencing runtime application can provide a lock to the event having the request. In addition, the event sequencing runtime application can remove the lock from the event having the request after receiving the indication that the function has completed work according to the request. The event sequencing runtime application can also grant the lock to another event that has an event sequencing key value that is the same as that of the event. Further, metadata regarding the invocation of the function can be provided to the one or more programs.

Figure 10:
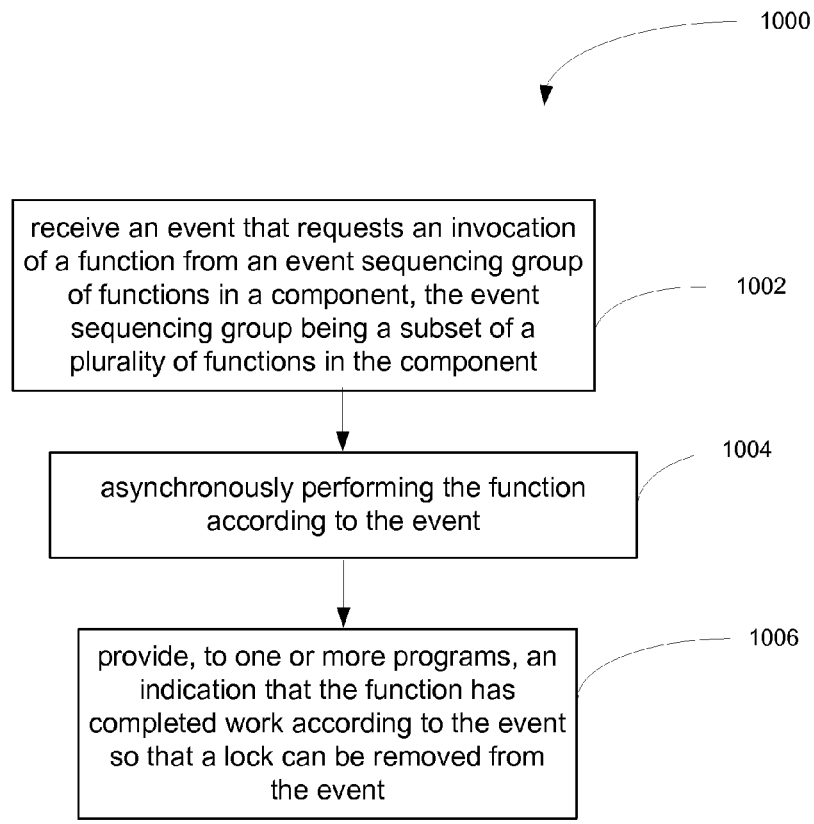
FIG. 10 illustrates another process for work completion.

FIG. 10 illustrates another process 1000 for work completion. At a process block 1002, the process 1000 receives an event that requests an invocation of a function from an event sequencing group of functions in a component. The event sequencing group is a subset of a plurality of functions in the component. In another embodiment, the process 1000 provides, to the one or more programs, an indication that the function has begun work according to the request. Further, at a process block 1004, the process 1000 asynchronously performs the function according to the event. In addition, at a process block 1006, the process 1000 provides, to one or more programs, an indication that the function has completed work according to the event so that a lock can be removed from the event.

Figure 11:
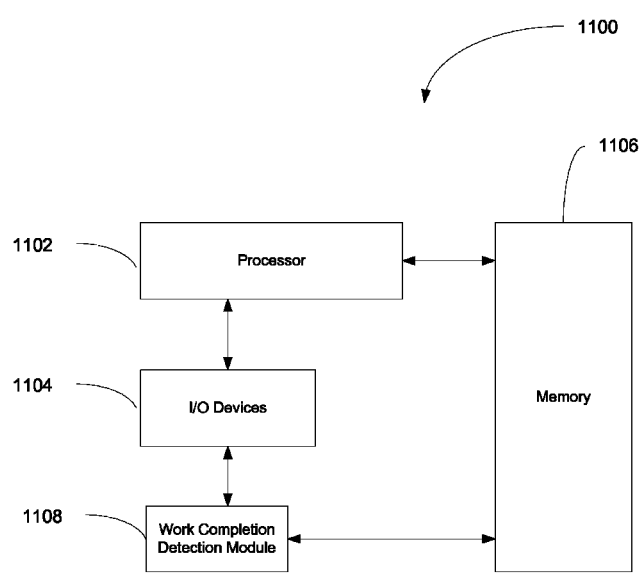
FIG. 11 illustrates a block diagram of a system that utilizes work completion detection.

FIG. 11 illustrates a block diagram of a system 1100 that utilizes work completion detection. In one embodiment, the system 1100 is suitable for storing and/or executing program code and is implemented using a general purpose computer or any other hardware equivalents. Thus, the system 1100 comprises a processor 1102, a memory 1106, e.g., random access memory ("RAM") and/or read only memory ("ROM"), a work completion detection module 1108, and various input/output devices 1104.

The processor 1102 is coupled, either directly or indirectly, to the memory 506 through a system bus. The memory 1106 can include local memory employed during actual execution of the program code, bulk storage, and/or cache memories which provide temporary storage of at least some program code in order to reduce the number of times code must be retrieved from bulk storage during execution.

The input/output devices 1104 can be coupled directly to the system 1100 or through intervening input/output controllers. Further, the input/output devices 1104 can include a keyboard, a keypad, a mouse, a microphone for capturing speech commands, a pointing device, and other user input devices that will be recognized by one of ordinary skill in the art. Further, the input/output devices 1104 can include a receiver, transmitter, speaker, display, image capture sensor, biometric sensor, etc. In addition, the input/output devices 1104 can include storage devices such as a tape drive, floppy drive, hard disk drive, compact disk ("CD") drive, etc.

Network adapters may also be coupled to the system 1100 to enable the system 500 to become coupled to other systems, remote printers, or storage devices through intervening private or public networks. Modems, cable modems, and Ethernet cards are just a few of the currently available types of network adapters.

It should be understood that the method and system described herein can take the form of an entirely hardware embodiment, an entirely software embodiment, or an embodiment containing both hardware and software elements. If software is utilized to implement the method or system, the software can include but is not limited to firmware, resident software, microcode, etc.

Further, the method and/or system can take the form of a computer program product accessible from a computer-usable or computer-readable medium providing program code for use by or in connection with a computer or any instruction execution system. For the purpose of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a RAM, a ROM, a rigid magnetic disk and an optical disk. Current example of optical disks include CD-read only memory ("CD-ROM"), CD-read/write ("CD-R/W") and DVD.

While the apparatus and method have been described in terms of what are presently considered to be the most practical and preferred embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

We claim:

1. A computer program product comprising a non-transitory computer useable storage medium having a computer readable program, wherein the computer readable program when executed on a computer causes the computer to:
   select a subset of functions from a set of functions defined in a component as an event sequencing group, wherein events for the functions in the event sequencing group are sequenced based on a processing order;
   for each of the functions in the event sequencing group defined in the component, add event sequencing qualifier code in the component's definition of that function, the event sequencing qualifier code indicating the processing order;

receive a request to invoke a function from the set of functions; and in response to determining that the function is in the event sequencing group and that there is no other invocation of the function having a same event sequencing identifier,
asynchronously perform the function in a multi-threaded environment according to the request and the processing order; and
provide, to one or more programs, an indication that the asynchronously performed function has completed work according to the request.

2. The computer program product of claim 1, wherein the computer readable program when executed on the computer further causes the computer to provide, to the one or more programs, an indication that the function has begun work according to the request.

3. The computer program product of claim 1, wherein the computer readable program when executed on the computer further causes the computer to establish a work completion contract with the one or more programs to provide the indication that the function has completed work according to the request.

4. The computer program product of claim 1, wherein the one or more programs includes an event sequencing runtime application.

5. The computer program product of claim 4, wherein the event sequencing runtime application provides a lock to the event having the request.

6. The computer program product of claim 5, wherein the event sequencing runtime application removes the lock from the event having the request after receiving the indication that the function has completed work according to the request.

7. The computer program product of claim 6, wherein the event sequencing runtime application grants the lock to another event that has an event sequencing key value that is the same as the event sequencing key value of the event.

8. The computer program product of claim 1, wherein the computer readable program when executed on the computer causes the computer to provide metadata regarding the invocation of the function to the one or more programs.

9. A method comprising:
selecting a subset of functions from a set of functions defined in a component as an event sequencing group, wherein events for the functions in the event sequencing group are sequenced based on a processing order;
for each of the functions in the event sequencing group defined in the component, adding event sequencing qualifier code in the component's definition of that function, the event sequencing qualifier code indicating the processing order;
receiving a request to invoke a function from the set of functions; and
in response to determining that the function is in the event sequencing group and that there is no other invocation of the function having a same event sequencing identifier,
asynchronously performing the function in a multi-threaded environment according to the request and the processing order; and
providing, to one or more programs, an indication that the asynchronously performed function has completed work according to the request.

10. The method of claim 9, further comprising providing, to the one or more programs, an indication that the function has begun work according to the request.

11. The method of claim 9, further comprising establishing a work completion contract with the one or more programs to provide the indication that the function has completed work according to the request.

12. The method of claim 9, wherein the one or more programs includes an event sequencing runtime application.

13. The method of claim 12, wherein the event sequencing runtime application provides a lock to the event having the request.

14. The method of claim 13, wherein the event sequencing runtime application removes the lock from the event having the request after receiving the indication that the function has completed work according to the request.

15. The method of claim 14, wherein the event sequencing runtime application grants the lock to another event that has an event sequencing key value that is the same as the event sequencing key value of the event.

16. The method of claim 9, further comprising providing metadata regarding the invocation of the function to the one or more programs.

17. A method comprising:
selecting a subset of functions from a set of functions defined in a component as an event sequencing group, wherein events for the functions in the event sequencing group are sequenced based on a processing order;
for each function in the event sequencing group, adding event sequencing qualifier code in the component's definition of that function, the event sequencing qualifier code indicating the processing order;
receiving an event that requests an invocation of a function from the event sequencing group of functions in the component;
in response to determining that there is no other invocation of the function having a same event sequencing identifier,
asynchronously performing the function in a multi-threaded environment according to the event and the processing order; and
providing, to one or more programs, an indication that the asynchronously performed function has completed work according to the event so that a lock can be removed from the event; and
in response to determining that there is another invocation of the function having a same event sequencing identifier, preventing the event from being processed.

18. The method of claim 17, further comprising providing, to the one or more programs, an indication that the function has begun work according to the request.

19. The method of claim 17, wherein the one or more programs includes an event sequencing runtime application.

20. The method of claim 17, wherein the lock is granted to another event that has an event sequencing key value that is the same as the event sequencing key value of the event.

21. A system comprising:
a processor; and
storage for storing program code, wherein the program code, when executed by the processor, performs:
selecting a subset of functions from a set of functions defined in a component as an event sequencing group, wherein events for the functions in the event sequencing group are sequenced based on a processing order;
for each of the functions in the event sequencing group defined in the component, adding event sequencing qualifier code in the component's definition of that function, the event sequencing qualifier code indicating the processing order;

receiving a request to invoke a function from the set of functions; and in response to determining that the function is in the event sequencing group and that there is no other invocation of the function having a same event sequencing identifier, asynchronously performing the function in a multi-threaded environment according to the request and the processing order; and providing, to one or more programs, an indication that the asynchronously performed function has completed work according to the request.

22. The system of claim 21, wherein the program code, when executed by the processor, provides, to the one or more programs, an indication that the function has begun work according to the request.

23. The system of claim 21, wherein the program code, when executed by the processor, establishes a work completion contract with the one or more programs to provide the indication that the function has completed work according to the request.

24. The system of claim 21, wherein the one or more programs includes an event sequencing runtime application.

25. The system of claim 24, wherein the event sequencing runtime application provides a lock to the event having the request.

26. The system of claim 25, wherein the event sequencing runtime application removes the lock from the event having the request after receiving the indication that the function has completed work according to the request.

27. The system of claim 26, wherein the event sequencing runtime application grants the lock to another event that has an event sequencing key value that is the same as the event sequencing key value of the event.

28. The system of claim 21, wherein the program code, when executed by the processor, provides metadata regarding the invocation of the function to the one or more programs.

* * * * *